United States Patent [19]
Giacomini

[11] Patent Number: 5,332,193
[45] Date of Patent: Jul. 26, 1994

[54] BALL VALVE WITH SEALING MEANS FOR THE CLOSURE PART

[75] Inventor: Mario Giacomini, Boleto, Italy

[73] Assignee: Giacomini Industriale, S.p.A., Italy

[21] Appl. No.: 107,507

[22] Filed: Aug. 17, 1993

[30] Foreign Application Priority Data

Nov. 27, 1992 [IT] Italy .................. MI92A-002725

[51] Int. Cl.$^5$ ................................ F16K 5/06
[52] U.S. Cl. .................. 251/315 BC; 251/317
[58] Field of Search ................ 251/314, 317, 315 BC

[56] References Cited

U.S. PATENT DOCUMENTS

| | | | |
|---|---|---|---|
| 3,437,310 | 4/1969 | Inch | 251/317 |
| 3,501,127 | 3/1970 | Freeman | 251/315 BC X |
| 3,545,721 | 12/1970 | Shafer | 251/315 BC X |
| 4,113,231 | 9/1978 | Halpine | 251/317 |
| 4,135,545 | 1/1979 | Fowler et al. | 251/317 X |

*Primary Examiner*—John C. Fox
*Attorney, Agent, or Firm*—Kirschstein et al.

[57] ABSTRACT

A ball valve with seals for the closure part, each seal is profiled in cross section and can be blocked in the closure part with the assistance of annular flanges which can be bent over against the seals.

9 Claims, 3 Drawing Sheets

BALL VALVE WITH SEALING MEANS FOR THE CLOSURE PART

BACKGROUND OF THE INVENTION

1. Field of the Invention

The present invention relates to a ball valve with sealing means for the closure part.

2. Description of the Related Art

In known valves, the spherical closure part consists of a single component with a cylindrical continuation for bearing the closure part and with an actuating handle.

In known valves, the sealing means usually consist of a coating of rubber or a similar material which sheathes the entire spherical body of the closure part and the bearing part of cylindrical construction, the sheathing which usually consists of rubber forming an annular sealing means. The sealing ring cooperates with a receiving seat which is recessed into a neck-like continuation of the valve body. The neck-like continuation of the valve body is constructed to be open towards the outside and to be coaxial with the receiving seat for the closure part and receives adjusting devices which can be removed from the shut-off member.

The known valves, which are fitted with a coated closure part, allow omission of the known seals which are located opposite one another and surround the shut-off means made of metal and with a ground surface. Furthermore, it is possible for the longitudinal dimension of the valve body to be reduced. However, in practice it has been proven with valves of this type that the valves fitted with a coated, spherical closure part have several disadvantages.

The integral component, consisting of the closure part, the cylindrical bearing part and the actuating handle, can be produced in one injection-molding operation; subsequently, the component is to be sheathed with the coating forming the seal by a further production operation. High processing accuracy and surface quality are required for the outer surface which is used for sealing. This requires the use of complex production processes, which has a disadvantageous effect on the production costs. Moreover, great expenditure is required for expensive sealing material. The production is subject to a low output rate and the production expenditure occurring is substantial.

Slight inaccuracies in the dimensions and the surface finish can adversely affect the sealing effect or lead to stiffness during opening and closing of the valve.

SUMMARY OF THE INVENTION

The object of the present invention is to provide a ball valve with which the disadvantages of the known valves can be avoided and the production of the closure part can take place inexpensively and efficiently by machining in automatic machinery. The expenditure for the sealing material is extremely low and a precise and reliable bonding of the sealing material to the backing material is made possible using automatic machinery.

In a ball valve the object according to the invention is achieved in that the sealing means on the closure part consist of at least one sealing ring which is profiled in cross section, in that the sealing ring is arranged in an annular groove which is recessed into the closure part in one plane, and the plane is arranged parallel to the axis of rotation of the closure part and to the through-bore of the closure part and, with the closure part in the shut-off position, is located opposite a valve seat, which can be shut off by the closure part, in the valve body, and in that projections are provided in the closure part adjacent to at least one edge of the groove, which projections can be deformed against the seal for fixing the seal.

A valve having a dual sealing effect is provided in that the sealing means on the closure part have a second seal which is profiled in cross section and is arranged in a second groove which is arranged parallel and opposite to the groove for receiving the first seal.

Simple and precise production of the closure parts is possible by machining in known automatic machinery which, for example, carries out turning and milling operations, due to the fact that the deformable projections consist of two annular flanges which are arranged concentrically and parallel to one another, bound a U-shaped groove and, prior to assembly of the seals in the closure part, are aligned perpendicular to the axis of rotation of the shut-off member in the valve body.

A precise arrangement, without the occurrence of local compression loading which could affect the even course of the outer profile of the seals after they have been assembled, is possible due to the fact that, after insertion of the seal and prior to deformation of the annular flanges, a wedge-shaped gap remains between the groove base and the bottom surface of the seals.

Seals can be used which can be inserted automatically and precisely in the receiving grooves and have a large-area, profiled surface as the sealing surface, and which guarantee optimum interaction with the sealing surfaces in the valve body.

This takes place due to the fact that the annular seal has an inner cylindrical surface and a bottom surface which, with the inner cylindrical surface, encloses an angle of 90° or of more than 90°, e.g. of between 91° and 95°, and has a curved outer surface which defines a sealing surface and lateral stop surfaces.

The advantages achieved by the invention are to be seen mainly in the fact that not only the valve bodies of the ball valves, but also the closure parts can be produced on automatic machinery and can thus be produced in a simple manner and at low cost.

A further advantage is to be seen in the fact that blocking off the sealing means by deforming the annular flanges and forming a conical receptacle, secure fixing and a precise positional arrangement of the seals constructed to be profiled in cross section become possible, which leads to a reliable sealing effect. Squashing and distortion of the sealing means, which could lead to a reduction of the sealing effect, are avoided.

A further advantage of the invention is to be seen in the fact that a good sealing effect is already achieved when using only a single seal. When using two seals, a valve is provided which has a dual sealing effect and can be produced at low cost.

It is obvious that the production costs are of considerable importance in ball valves since ball valves are usually mass-produced articles of large-series productions.

The closure parts can be constructed integrally together with the bearing piece of cylindrical construction. This leads to the fact that the closure parts can be actuated either via an actuating lever, which is attached via a screw, or via a drive motor. The closure parts can thus be produced to a standard design. The closure parts are advantageously fitted with a bore which extends coaxially with the axis of rotation and intersects the through-bore of the shut-off member. For this reason, the closure parts can be used for all valve bodies which are actuated in various ways and have any desired straight or angular valve bodies, e.g. consisting of one or more components. A short constructional length for the valve is always achieved.

BRIEF DESCRIPTION OF THE DRAWINGS

Two exemplary embodiments of the ball valve according to the invention are illustrated in the drawings, in which.

DETAILED DESCRIPTION OF THE PREFERRED EMBODIMENTS

Figure 1:
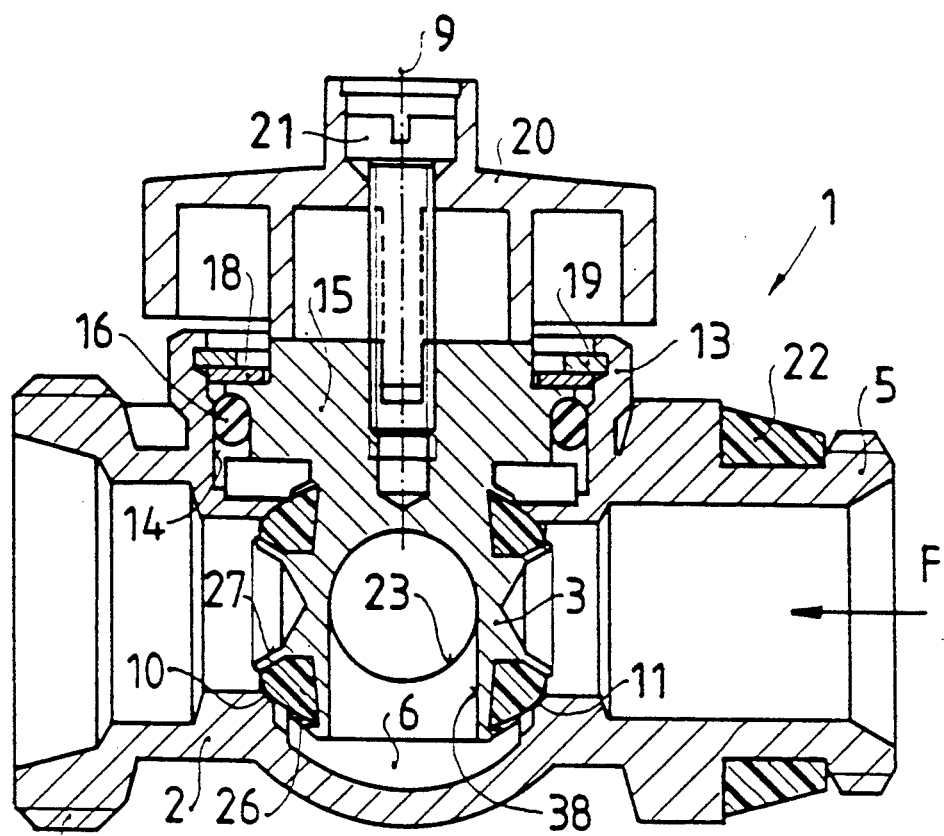
FIG. 1 shows a longitudinal section through a ball valve with a closure part which is fitted with two seals and is in the shut-off position.
Figure 2:
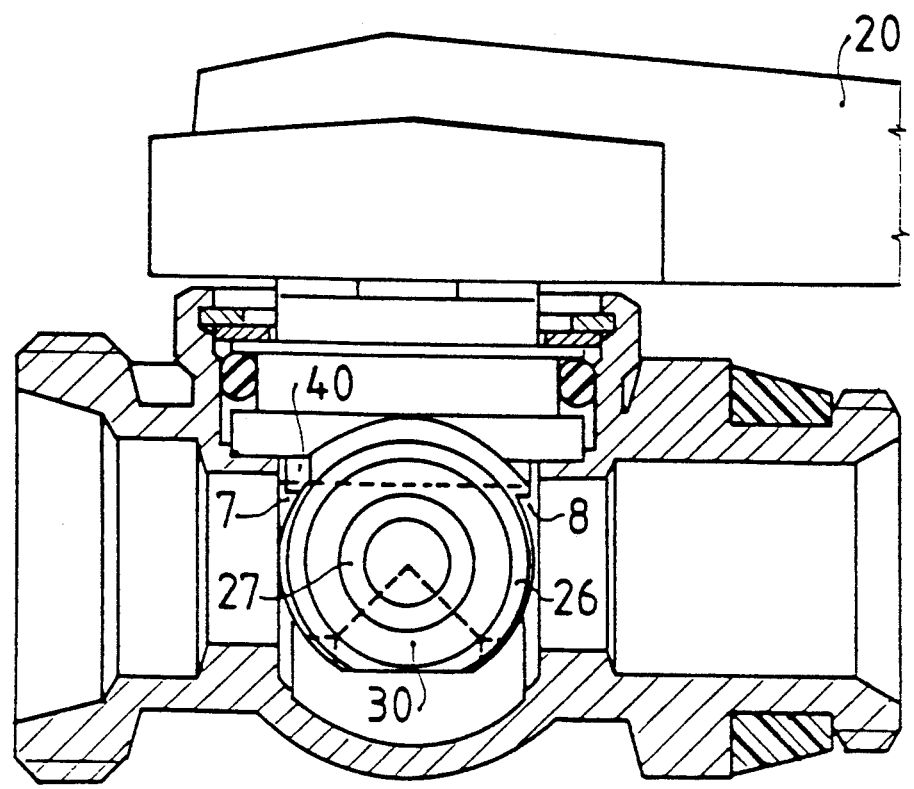
FIG. 2 shows a sectional illustration of the valve according to FIG. 1 with the closure part in the throughflow position.

Illustrated as an example in FIGS. 1 and 2 is a ball valve 1 which serves, for example, for emptying water from heating boilers.

The valve 1 consists of a valve body 2 and a closure part 3. The valve body 2 has an outlet nozzle 4 and an inlet nozzle 5; both nozzle apertures open out inside the valve body 2 into a chamber 6 which receives the closure part 3, specifically in planes 7 and 8 which form valve seats 10 and 11 which can be shut off by the closure part 3. The planes 7 and 8 are located opposite one another and are arranged parallel to one another as well as to the axis of rotation 9 of the shut-off member 3.

The valve body 2 has a neck-like continuation 13 into which a receiving seat 14 is recessed, which serves for receiving and bearing the cylindrical part 15 of the closure part 3 with interposition of annular, removable sealing rings 16. A known attachment device for the component 15 consists of a disc 18 and a spring ring 19.

Figure 4:
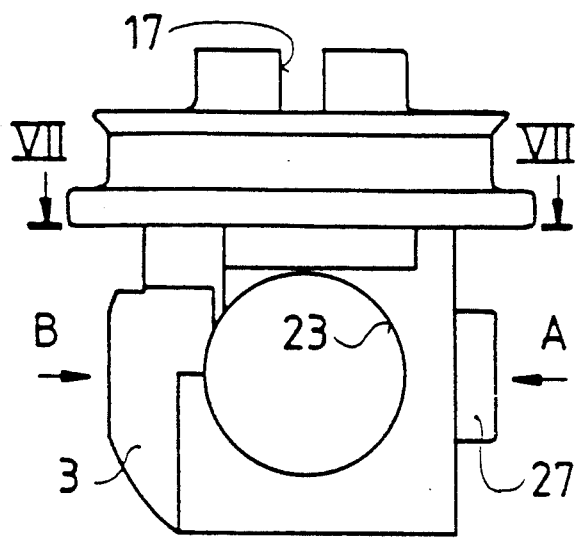
FIG. 4 shows a front view of the closure part for receiving a single seal.
Figure 6:
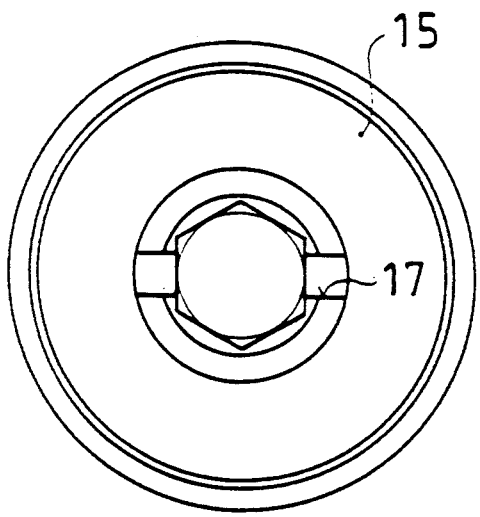
FIG. 6 shows a plan view of the closure part according to FIG. 3.
Figure 5:
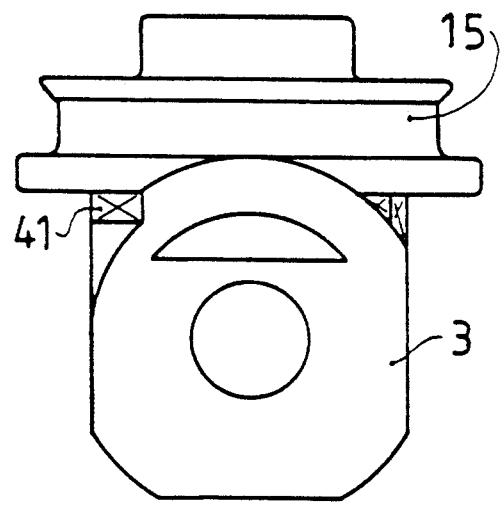
FIG. 5 shows a lateral view of the closure part according to arrow B of FIG. 4.
Figure 7:
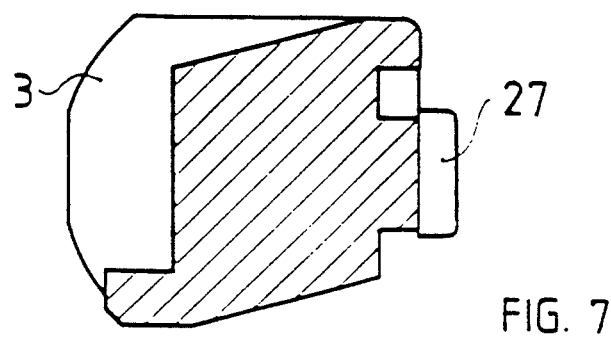
FIG. 7 shows a section along the line VII—VII of FIG. 4.

The closure part 3 is mounted so as to be pivotable through 90° in order to be rotated from an opening position into a shut-off position. This takes place via an actuating handle 20 which is mounted on the shut-off member 3 by means of a screw 21. A drive rib or three drive ribs (not illustrated) come into operative connection with the groove 17 of the shut-off member 3 according to FIGS. 4 and 6. 22 denotes a seal of annular construction on the nozzle 5.

According to the invention, the sealing of the closure part in the valve body 2 in the direction of the fluid flow denoted by an arrow F is achieved via one or two annular seals which are mounted directly on the closure part 3.

Figure 8:
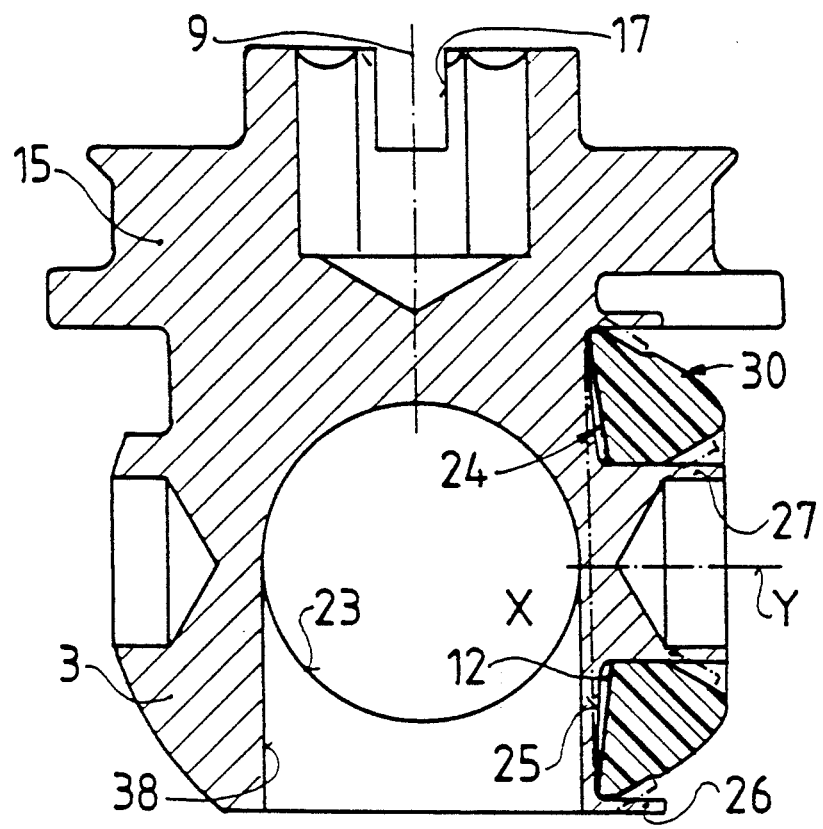
FIG. 8 shows a vertical section of the closure part according to FIG. 4 in the plane of the drawing on an enlarged scale, with a seal inserted before it is fixed in position.
Figure 9:
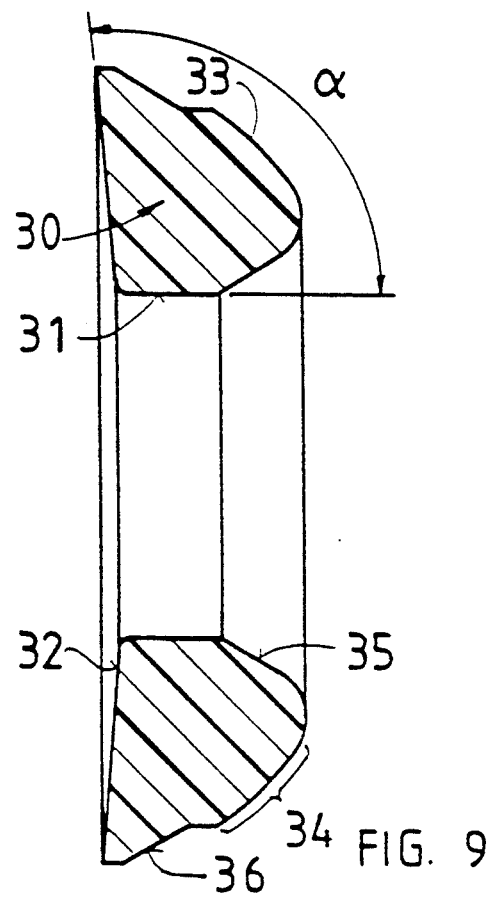
FIG. 9 shows a cross section through a seal on an enlarged scale.

In closure parts with only one sealing means, as shown in FIGS. 3 to 8, a groove 24 is recessed in the plane X of the closure part, said plane extending parallel to the axis of rotation of the closure part and to the through-bore 23 of the closure part according to FIG. 8, which groove advantageously has a U-shaped cross section. With the closure part 3 in the shut-off position, the groove 24 is arranged opposite one of the valve seats 7, 8 of the valve body to be shut off.

The groove 24 has a bottom 25 and two projections 26, 27 which project in the manner of wings and form thin annular flanges. The annular flanges 26, 27 are arranged concentrically and perpendicular to the axis of rotation 9 of the shut-off member. In an advantageous manner, the bottom 25 of the groove 24 is illustrated diverging slightly towards the outside of the closure part. The seal 30 has an inner surface 31 of cylindrical construction, a bottom surface 32, and an outer surface 33 which runs in a curved manner and forms the actual sealing surface 34. Furthermore, lateral boundary surfaces 35 and 36 of annular construction are provided.

The boundary surface 36 which has an enlarged diameter is constructed to be inclined. The angle $\alpha$ formed between the inner surface 31 and the bottom surface 32 of the sealing means 30 corresponds to 90° or advantageously, as shown in the diagram, an angle of greater than 90°, advantageously an angle of between 90° and 95°.

The sealing ring is assembled as follows:

After the sealing ring 30 has been inserted in the groove 24 (FIG. 8), the sealing ring 30 is blocked with simultaneous conical deformation of the annular flanges 26, 27 against the seal 30, i.e. against the stop zones 36 and 35 as can be seen by the dot-dashed lines in FIG. 8. The annular flange 26 is bent inwards and the annular flange 27 is bent outwards by a pressure being applied in the direction of the common axis Y. During the bending operation, the seal 30 is pressed against the bottom 25 of the groove 24 and assumes precisely that position in which the curved sealing surface 34 completes the spherical surface of the shut-off member 3. A curved profile of this type is recessed into valve seats 10 and 11 to be shut off.

Figure 3:
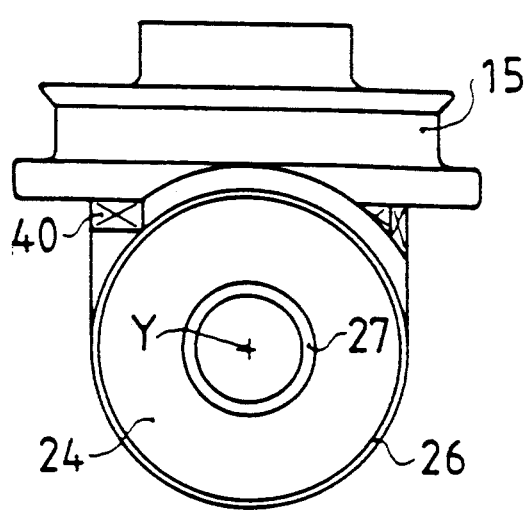
FIG. 3 shows a lateral view of the closure part according to arrow A in FIG. 4.

In the valve body illustrated in FIGS. 1 and 3, the closure part can bring about a dual sealing effect. For this purpose, not just one seal 30, but two seals 30 are arranged in the closure part. As already described, the sealing means are arranged in grooves 24 which are arranged in planes X which come to rest symmetrically relative to the axis of rotation 9 of the shut-off member 3 and parallel to the axis of the through-bore 23.

The shut-off members 3 illustrated advantageously have a bore 38 which is arranged coaxially with the axis of rotation 9 and opens out into the through-bore 23 in order thus to allow the use of the shut-off members both in valve housings of straight construction and in valve housings of angled construction.

The angle of rotation of 90° of the shut-off member is defined by stops 40, 41 which are provided on the shut-off member 3 and strike against lateral surfaces 7 and 8 which have the throughflow apertures 10 and 12 to be shut off.

During operation, the seals 30 allow a free throughflow of the fluid through the valve body when the valve is open (FIG. 2). By rotating the shut-off member through 90°, the throughflow through the through-bore 23 between the nozzles 4 and 5 is interrupted. When a closure part with one seal is used, the sealing means rests in a sealing manner against the valve seat 10 or 12, as a result of which no throughflow of the fluid is possible. When a shut-off member with two seals is used, a throughflow aperture 10 is shut off by each seal.

The design of the seals in the manner of sectors which are bounded by spherical surfaces, and the design of the throughflow apertures which can be shut off, and the design of the grooves for receiving the seals can be substituted by technically identical solutions.

I claim:

1. A ball valve, comprising:
   a) a housing having a duct extending along a longitudinal axis between an inlet and an outlet, and an annular valve seat within the duct;
   b) a ball mounted in the duct for turning movement, and having a bore and a pair of annular projections extending outwardly of, and being of one-piece with, the ball, said projections bounding an annular groove therebetween;
   c) an annular sealing ring mounted in the groove;
   d) said projections being constituted of a bendable material that is deformable from an initial position in which the projections are concentric with the longitudinal axis and spaced radially apart to receive the sealing ring, to a final position in which the projections are bent towards each other to engage and fixedly secure the sealing ring in the groove; and
   e) means for jointly turning the ball and the ring secured thereon between open and closed positions in which the bore is aligned and misaligned, respectively, with the duct, said ring sealingly engaging the valve seat in the closed position.

2. The valve according to claim 1, wherein the ring has an inner cylindrical surface extending generally parallel to the longitudinal axis, and an inclined bottom surface bounding with the inner cylindrical surface an angle of inclination that ranges from about 90° to about 95°.

3. The valve according to claim 2, wherein the angle of inclination is an obtuse angle.

4. The valve according to claim 2, wherein the groove has an annular base that bounds a wedge-shaped clearance with the inclined bottom surface of the ring in the initial position.

5. The valve according to claim 2, wherein the ring has an outer curved sealing surface that sealingly engages the valve seat, and wherein the ring has an outer boundary surface radially outwardly of the sealing surface and engaged by an outer one of the projections in the final position, and wherein the ring has an inner boundary surface radially inwardly of the sealing surface and engaged by an inner one of the projections in the final position.

6. The valve according to claim 1, wherein the groove has a generally U-shaped cross-section.

7. The valve according to claim 1, wherein the ball has opposite sides relative to a central turning axis about which the turning means turns the ball, and wherein the sealing ring and the pair of projections are located at one of said sides.

8. The valve according to claim 7, and further comprising another pair of projections and another sealing ring identical to said first-mentioned pair of projections and ring, and wherein the rings and pairs of projections are located at both said sides of the ball and are symmetrically arranged relative to the turning axis.

9. The valve according to claim 8, wherein the rings are generally arranged in mutually parallel planes.

* * * * *